United States Patent [19]

Bondoc et al.

[11] 4,258,098

[45] Mar. 24, 1981

[54] GLASS FIBER MAT WITH IMPROVED BINDER

[75] Inventors: Alfredo A. Bondoc, Middlesex, N.J.; Philip A. Cautilli, Feasterville, Pa.

[73] Assignee: GAF Corporation, New York, N.Y.

[21] Appl. No.: 45,934

[22] Filed: Jun. 6, 1979

[51] Int. Cl.³ .................. D04H 1/58; B32B 27/00; D04H 1/64; D21H 3/52
[52] U.S. Cl. .................. 428/288; 65/4 R; 525/66; 525/164; 260/29.4 UA; 156/331; 156/62.2; 428/392; 428/290; 162/156; 162/167; 162/168 NA; 264/128
[58] Field of Search .................. 428/288, 290, 392; 260/29.4 UA; 65/4 R; 525/66, 164; 156/331, 62.2; 162/156, 169, 168 NA, 167

[56] References Cited

U.S. PATENT DOCUMENTS

| | | | |
|---|---|---|---|
| 3,743,612 | 7/1973 | Vial | 260/29.4 UA |
| 3,940,537 | 2/1976 | Burns | 428/288 |
| 4,018,647 | 4/1977 | Niefma | 162/156 |
| 4,183,783 | 1/1980 | Bondon et al. | 162/156 |
| 4,200,487 | 4/1980 | Bondoc et al. | 162/156 |

Primary Examiner—George F. Lesmes
Assistant Examiner—E. Rollins Buffalow
Attorney, Agent, or Firm—James Magee, Jr.; Walter Katz

[57] ABSTRACT

A glass fiber mat having excellent tensile strength and flexibility is provided herein. The mat includes a plurality of glass fibers and a binder therefor which is characterized by comprising about 25% to 90% by weight of a urea-formaldehyde resin and about 10% to 75% by weight of a styrene-butadiene latex copolymer containing about 0.1% to 5% by weight of an acrylamide type monomer.

12 Claims, No Drawings

GLASS FIBER MAT WITH IMPROVED BINDER

BACKGROUND OF THE INVENTION

1. Field of the Invention

This invention relates to glass fiber mats which include an improved binder, particularly for application in roofing and flooring products.

2. Description of the Prior Art

Glass fiber mats are composed of glass fibers held together by a binder material. Typical binders used in the industry are urea-formaldehyde resins, phenolic resins, bone glue, polyvinyl alcohols, acrylic resins and polyvinyl acetates. These binder materials are impregnated directly into the fibrous mat and set or cured to provide the desired integrity for the glass fibers.

Unfortunately, the binder materials of the prior art are deficient in one or more respects for glass fiber mats. In particular, such binder materials provide glass fiber mats which exhibit only acceptable tensile strengths at room temperature or at elevated temperatures. Furthermore, the tensile strengths of such mats deteriorate appreciably when the mats are subjected to wet conditions, which can be encountered in their use in roofing and flooring products. In addition, these prior art mats have relatively poor flexibility resulting in buckling, creasing or cracking of the mats during use as a base in asphalt roofing shingles, or as a backing felt or base support for sheet vinyl flooring.

Accordingly, it is an object of this invention to provide glass fiber mats which include an improved binder therefor, and, particularly, glass mats having properties which are desirable for use in roofing and flooring products.

A feature of the invention is the provision of glass fiber mats with an improved binder therewith which exhibits, in combination, excellent tensile strengths at both room and elevated temperatures, and also under wet conditions, and which shows a high degree of flexibility in commercial use in the roofing and flooring industries.

SUMMARY OF THE INVENTION

The above stated objects and features of the invention are accomplished herein by providing a glass fiber mat composed of a plurality of glass fibers held together by an improved binder comprising about 25% to 90% by weight of urea-formaldehyde resin and about 10% to 75% by weight of a styrene-butadiene latex copolymer containing about 0.1% to 5% by weight of acrylamide, methacrylamide, N-methylolacrylamide, N-methylolmethacrylamide, or mixtures thereof.

The glass mats of the invention are made by applying the binder composition to the wet glass mat, drying and curing the binder at elevated temperatures. The finished glass mat product contains about 70% to 90% by weight glass fibers and about 10% to 30% by weight of binder.

In the best mode of the invention, the binder is comprised of about 80% by weight of urea-formaldehyde and about 20% by weight of styrene and butadiene latex copolymer containing about 40% by weight styrene and 60% by weight butadiene, modified with about 2% to 4% by weight of the acrylamide type monomer. The fibrous material is present in an amount of about 80% by weight and the binder about 20% by weight of the mat.

The urea-formaldehyde component of the binder preferably is a modified resin containing methylol type groups which can be cured to form methylene or ether type linkages in the binder.

DETAILED DESCRIPTION OF THE INVENTION

The following detailed description of the invention will be made with particular reference to a wet-laid process for preparing glass fiber mats, although it will be understood that other processes known in the art, such as a dry-laid process, may be used as well. Furthermore, the description is made using chopped bundles of glass fibers, although other forms of glass fibers such as continuous strands, also may be used.

The process of forming glass fiber mats according to the invention begins with chopped bundles of glass fibers of suitable length and diameter. Generally, fibers having a length of about ¼ inch to 3 inches and a diameter of about 3 to 20 microns are used. Each bundle may contain from about 20 to 300, or more, of such fibers, which may be sized or unsized, wet or dry, as long as they can be suitably dispersed in an aqueous dispersant medium. The bundles are added to the dispersant medium to form an aqueous slurry. Any suitable dispersant known in the art may be used. The fiber slurry then is agitated to form a workable dispersion at a suitable consistency. The dispersion then is passed to a mat-forming machine. En route to the screen, the dispersion usually is diluted with water to a lower fiber concentration.

The fibers are collected at the wire screen in the form of a wet fiber mat and the excess water is removed by vacuum in the usual manner. The wet mat now is ready for application of the binder composition thereto, which is accomplished by soaking the mat in an excess of binder solution and dewatering under vacuum, to remove excess binder solution. The mat then is dried and the binder composition is cured in an oven at elevated temperatures, generally at least about 400° F. This heat treatment alone will effect curing; alternatively, but less desirable, catalytic curing may be used, such as with an acid catalyst, e.g. ammonium chloride or p-toluene sulfonic acid.

The binder composition of the invention is prepared by blending a urea-formaldehyde resin with a styrene-butadiene latex copolymer containing about 0.1% to 5% of an acrylamide type monomer, for example, acrylamide, methacrylamide, N-methylolacrylamide, N-methylolmethacrylamide, or mixtures thereof. Suitably, the binder composition comprises about 25% to 90% by weight of the urea-formaldehye resin and about 10% to 75% by weight of the modified styrene-butadiene latex copolymer. Preferably, it consists of about 50% to 85% of the urea-formaldehyde and about 15% to 50% of the particular styrene-butadiene latex copolymer. In the optimum mode of the invention, the ratio is about 80% of the resin and about 20% of the latex copolymer.

The styrene-butadiene latex copolymer component of the binder composition suitably may contain about 10% to 90% by weight of styrene and 90% to 10% by weight of butadiene, modified by said 0.1% to 5% by weight thereof of said acrylamide type monomer. Small amounts of other monomers, such as carboxylic acids, e.g. methacrylic, fumaric or itaconic acid, also may be present, if desired, in the styrene-butadiene copolymer. Preferably, about 30% to 70% styrene and 70% to 30% butadiene is used; optimally the ratio is about 40% styrene to about 60% butadiene.

The acrylamide monomer preferably is present in an amount of about 1% to 4% of the styrene-butadiene content of the latex copolymer, and, optimally about 2% to 3%. The acrylamide material may be used individually or as mixtures thereof, e.g. acrylamide and N-methylolacrylamide, may be used, generally in about equal proportions.

A preferred commercial source of styrene-butadiene latex copolymer is "6200-SBR", sold by the GAF Corporation, Chattanooga, Tennessee.

The urea-formaldehyde resins of the binder composition also are commercially available materials, for example, urea-formaldehyde resins such as "S-3701-C" sold by Pacific Resins and Chemicals, Inc., Tacoma, Washington, and "PR-913-23", sold by Borden Chemical, Columbus, Ohio, may be used. These resins generally are modified with methylol groups which upon curing form methylene or ether linkages. Such methylols may include N,N'-dimethylol; dihydroxymethylolethylene; N,N'-bis(methoxymethyl), N,N'-dimethylolpropylene; 5,5-dimethyl-N,N'-dimethylolpropylene; N,N'-dimethylolethylene; N,N'-dimethylolethylene and the like.

The resin and latex copolymer components of the binder composition are quite compatible. Accordingly, they are intimately admixed in aqueous solution to form a stable emulsion which does not become gummy, or gel, even after prolonged storage, e.g. for periods of a week or longer, which is advantageous in practical commercial use of the composition.

The following examples will illustrate the invention with more particularity, but are not to be construed as limiting thereof.

EXAMPLE 1

In a typical run, about 2.7 g. (dry basis) of chopped bundles of glass fibers having a length of 1 inch and a diameter of 13 microns was dispersed with agitation in water containing 20 ppm of "Aromox DMHT," Armak Co., McCook, Illinois, at a fiber consistency of 0.02% by weight of fibers in the aqueous slurry. The dispersion then was formed into a wet glass mat by passing it onto a wire mesh with vacuum applied to remove excess water. The moisture content of the wet mat was about 40%.

A binder composition was prepared by mixing 135 g. of styrene-butadiene latex copolymer emulsion containing 2% by weight N-methylolacrylamide ("6200-SBR" GAF Corp-45% solids) and 440 g. of urea-formaldehyde resin ("S-3701-C" Pacific Resin and Chemical, Inc.-55% solids), and diluting with water to a 20% by weight solids content solution, i.e. about 4% styrene-butadiene and 16% urea-formaldehyde. The pH of the composition was 7.3.

The wet glass mat, suspended on the wire mesh, then was soaked into the thus-prepared binder composition, and excess binder removed by reapplying vacuum. The resultant wet glass mat, with binder applied, contained about 34% by weight glass fibers, 9% binder and 57% water.

The wet glass mat then was dried and cured for about 5 minutes at about 400° F. The resultant dry glass mat contained about 20% by weight binder; its basis weight was 100 g./m$^2$.

The physical properties of the finished glass mat are given below:

| Tensile Strength* | N/50mm |
|---|---|
| (a) at room temp. | 430 |
| (b) at 400° F. | 356 |
| (c) under wet conditions | 260 |
| Flexibility** | mm |
| mandrel diameter | 100 |

*Instron Tensile Tester - 50 mm side mat strips with crosshead speed of 13 mm/min. and jaw span of 170 mm.
**A strip of mat was wrapped around mandrels of different diameters. The onset of creasing or buckling of the sample was noted at the given diameter of the mandrel.

What is claimed is:

1. A glass fiber mat having excellent tensile strength and flexibility properties consisting essentially of a plurality of glass fibers and a binder to hold said fibers together, characterized in that said binder comprises about 25% to 90% by weight of urea-formaldehyde resin and about 10% to 75% by weight of a styrene-butadiene latex compolymer containing about 0.1% to 5% by weight of acrylamide, methacrylamide, N-methylolacrylamide, or N-methylolmethacrylamide, or mixtures thereof.

2. A glass fiber mat according to claim 1 wherein said urea-formaldehyde resin comprises about 50% to 85% and said styrene-butadiene latex copolymer about 15% to 50% of said binder.

3. A glass fiber mat according to claim 1 wherein said urea-formaldehyde resin comprises about 80% and said styrene-butadiene latex compolymer about 20% of said binder.

4. A glass fiber mat according to claim 1 wherein said styrene-butadiene latex copolymer comprises about 10% to 90% by weight styrene and about 90% to 10% by weight butadiene.

5. A glass fiber mat according to claim 1 wherein said styrene-butadiene latex copolymer comprises about 30% to 70% styrene and about 70 to 30% butadiene.

6. A glass fiber mat according to claim 1 wherein said styrene-butadiene latex copolymer comprises about 40% styrene and 60% butadiene, and about 2% by weight thereof of N-methylolacrylamide.

7. A glass fiber mat according to claim 1 wherein said acrylamide is present in an amount of about 1% to 4% by weight of said styrene-butadiene.

8. A glass fiber mat according to claim 1 wherein said binder is cured.

9. A glass fiber mat according to claim 8 wherein said curing is effected by heating the wet glass mat with binder applied at an elevated temperature.

10. A glass fiber mat according to claim 1 wherein said urea-formaldehyde resin contains a methylol group.

11. A glass fiber mat according to claim 1 further characterized by having a porosity sufficient to impregnate asphalt therein.

12. A method of making an improved glass fiber mat which comprises forming said glass fibers into a wet mat, applying said binder composition of Claim 1 thereto, drying and curing said binder at elevated temperatures.

* * * * *